Oct. 27, 1959  R. W. CUSHMAN ET AL  2,910,649
MEASURING APPARATUS
Filed March 12, 1956
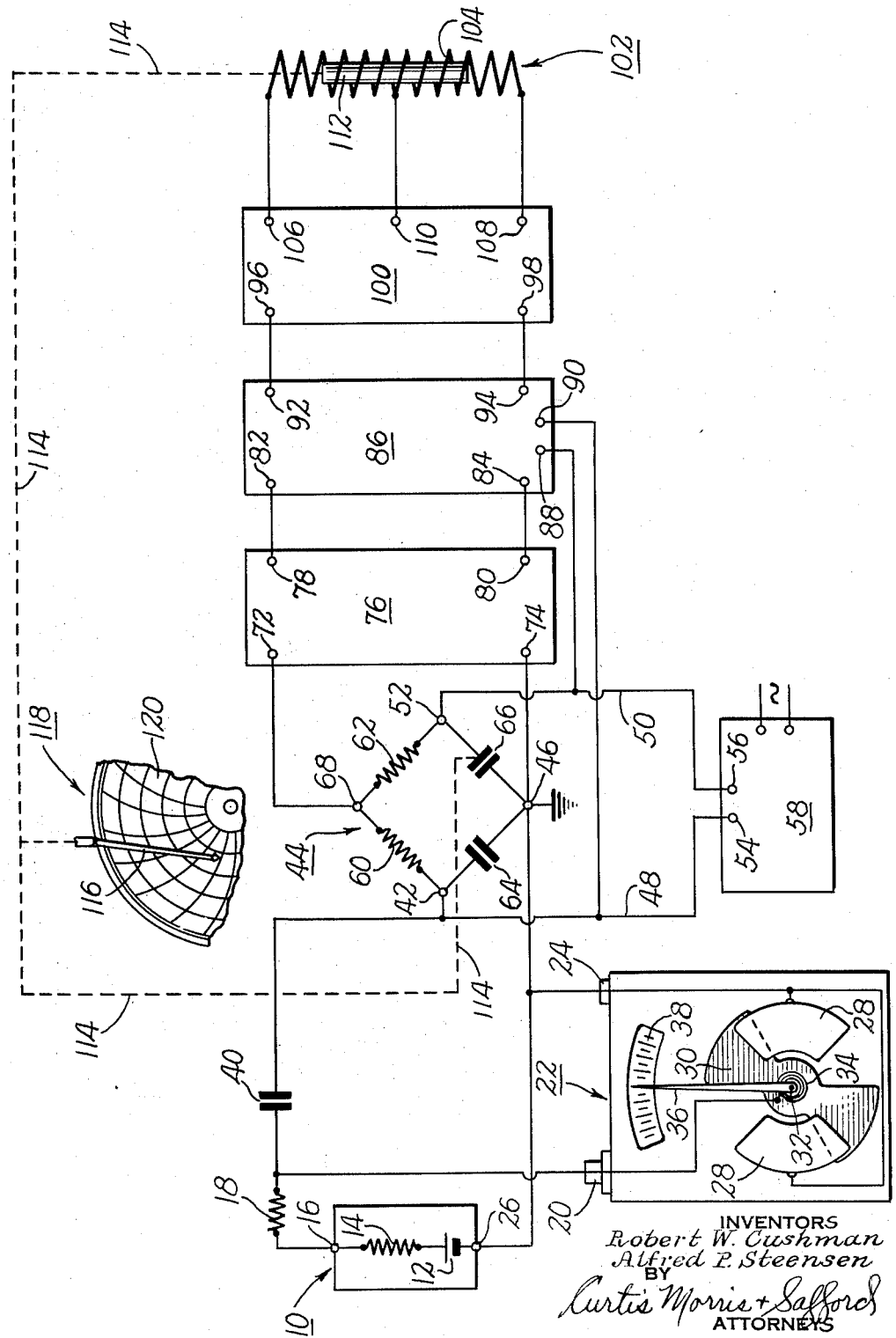
INVENTORS
Robert W. Cushman
Alfred P. Steensen
BY
Curtis, Morris + Safford
ATTORNEYS

2,910,649

MEASURING APPARATUS

Robert W. Cushman and Alfred P. Steensen, Sharon, Mass., assignors to The Foxboro Company, Foxboro, Mass., a corporation of Massachusetts Application March 12, 1956, Serial No. 570,843

4 Claims. (Cl. 324—100)

This invention relates to voltage measuring apparatus, and more particularly to apparatus for continuously measuring and recording the voltage of a source without drawing any significant current from the source.

Voltage measuring devices have often been used industrially to determine the values of conditions such as temperature, etc., by measuring the potential of condition-sensitive elements. Commonly these devices are used in conjunction with ancillary apparatus requiring substantial power for their operation, such as recorders to display a continuous record of the voltage measurements over a given period of time, or controllers to maintain the condition at a set value.

One feature of many prior voltage measuring devices used in this manner is that they draw a fairly substantial amount of current from the source of voltage being measured. For most conventional applications, this has caused no great difficulty. However, it frequently is desired to measure and continuously record or control the voltage of sources having a relatively high internal impedance, and it will be apparent that for such applications any flow of current from the source will tend to produce a relatively large error in the voltage measurement due to the resultant high voltage drop across the internal impedance. Various attempts have been made heretofore to solve this problem, but none has been fully satisfactory from a commercial point of view.

Accordingly, it is an object of this invention to provide voltage-responsive apparatus that is superior to such apparatus provided heretofore. It is a further object of this invention to provide voltage-measuring apparatus especially adapted to control the relatively high power fed to ancillary equipment without drawing any effective current from the source of voltage being measured. It is a still further object of this invention to provide an instrument that is capable of accurately measuring and recording the voltage of a source having a very high internal impedance.

In a preferred embodiment of the present invention, to be described hereinbelow in more detail, a voltage-sensitive device referred to as an electrostatic voltmeter is connected to a source of voltage having a relatively high internal impedance and the potential of which it is desired to measure and record. This voltmeter is of the type having a set of movable plates the position of which relative to a set of fixed plates is controlled by electrostatic forces in accordance with the magnitude of the potential being measured. Coupled to this voltmeter is a capacity-responsive device having an output drive motor arranged to move the pen of a conventional recorder in response to changes in the electrical capacity between the voltmeter plates. With this arrangement, any variation in the source potential will be reflected in a corresponding change in relative positioning of the voltmeter plates, and the resultant change in electrical capacitance between these plates will cause a corresponding movement of the recording pen. Hence, the recorder presents a continuous record of the source voltage, and yet effectively no current is drawn from the source.

Other objects, advantages and aspects of the present invention will be in part pointed out in, and in part apparent from, the following description of a preferred embodiment of the invention, considered together with the accompanying drawing which is a schematic diagram, partly in block form, of a voltage measuring and recording system.

Referring now to the left-hand side of the drawing, there is shown an element, diagrammatically indicated within a block 10, the voltage of which is to be measured. This element 10 includes a source of direct-current potential 12 (the potential of which may vary in accordance with changes in some external condition) in series with an internal resistance 14 of relatively high ohmic value, e.g. of the order of thousands of megohms. One terminal 16 of this element is connected through an isolating resistor 18, e.g. having an ohmic resistance of about 100 megohms, the left-hand terminal 20 of an electrostatic voltmeter generally indicated at 22. The other voltmeter terminal 24 is connected to the lower terminal 26 of the element 10.

The voltmeter 22 shown herein is of conventional construction, and includes a set of fixed plates 28 connected to the right-hand meter terminal 24. Rotatable in interleaved mesh relation with respect to the fixed plates, i.e. in the manner of an ordinary tunable air capacitor, is a set of movable plates 30 mounted on a central shaft 32 preferably supported in low-friction bearings (not shown). The movable plates are rotatably biased away from the fixed plates by a small spiral spring 34. An indicating pointer 36 is secured to the movable plates and its tip traverses past a meter scale 38 which is calibrated to read volts.

It is desired to point out at this time that the term "voltmeter" is used herein only for convenience in identifying the functions performed by the device 22 as part of the overall measuring system disclosed. It will be apparent from the description hereinbelow that an important one of these functions is to produce variations in electrical capacity corresponding to variations in the potential of the source voltage being measured, without drawing any significant current from the source. Although a conventional electrostatic voltmeter is shown in the drawings for this purpose, it should be noted that this function can be performed by other forms of apparatus which might ordinarily not be termed "voltmeters."

An electrostatic voltmeter operates on the principle that when a capacitor is charged to a given potential, the plates of the capacitor are attracted to each other by a force which is proportional to the square of the charge potential. When the voltmeter 22 is coupled to the element 10 as shown, the capacitor formed by the fixed plates 28 and the movable plates 30 is charged up to the potential of the source 12. Thus, these plates are attracted towards each other (i.e. towards the position where the plates are fully aligned) by a force determined by the magnitude of the sorce potential, and consequently the movable plates take a position such that the electrostatic force of attraction is balanced by the bias force produced by the spiral spring 34.

Furthermore, as the movable plates 30 rotate in accordance with variations in the magnitude of the source potential 12, the electrical capacitance between the sets of movable plates and fixed plates 28 will vary correspondingly. As described hereinbelow, this change in capacitance is in turn measured by a capacity-responsive device which is arranged to drive a recorder pen to produce a graphic record of the variations in capacity; and since the capacity between the voltmeter plates is determined by the source potential being measured, the record produced can be calibrated directly in volts. A device suitable for measuring and recording such capacity variations is described in detail in U.S. Patent 2,630,008, issued to W. H. Howe et al., on March 3, 1953, and accordingly the description herein will be limited to outlining the basic functions involved.

The left-hand terminal 20 of the voltmeter 22 is coupled through a D.-C. blocking capacitor 40, e.g. having a capacitance of 100 micromicrofarads, to one junction point 42 of a balancing impedance bridge generally indicated at 44; the other voltmeter terminal 24 is connected to the lower bridge junction 46 and also to ground. This bridge is provided with alternating-current energization through two leads 48 and 50 connected respectively between two opposite bridge junctions 42 and 52 and a pair of output terminals 54 and 56 of an oscillator generally indicated in block form at 58, and arranged to produce an output signal having a frequency of about 5000 cycles.

The balancing bridge 44 comprises two adjacent resistance arms 60 and 62 connected together with two adjacent capacitance arms 64 and 66, the latter being a variable air capacitor which is adjusted through a feedback arrangement to be described to maintain the bridge in balance substantially at all times. When the bridge becomes unbalanced, e.g. by virtue of a change in the capacitance between the voltmeter plates 28 and 30 in response to a change in potential of the source 12, an alternating-current unbalance signal will be developed between the upper and lower bridge junctions 68 and 46. The amplitude of this signal will be proportional to the extent of bridge unbalance (i.e. to the magnitude of the capacitance variation), and its phase will be determined by the direction of unbalance (i.e. by whether the capacitance increased or decreased).

This unbalance signal is fed to the input terminals 72 and 74 of a conventional A.-C. amplifier generally indicated in block form at 76. The intensified output signal from this amplifier is coupled from output terminals 78 and 80 to the input terminals 82 and 84 of a phase-sensitive detector generally indicated in block form at 86. This detector is provided with a suitable phase-reference signal by connections between a pair of its terminals 88 and 90 and the oscillator 58.

As described in the above-mentioned patent, the phase-sensitive detector is arranged to produce a direct-current output signal the magnitude of which is proportional to the extent of bridge unbalance, and the polarity of which is determined by the direction of unbalance. This direct-current signal is fed from the detector output terminals 92 and 94 to the input terminals 96 and 98 of a D.-C. power amplifier generally indicated in block form at 100. The output circuit of this latter amplifier drives a rebalancing solenoid motor generally indicated at 102, and which includes a center-tapped solenoid winding 104 having its ends connected to the amplifier output terminals 106 and 108 and its center tap connected to the output terminal 110. When the bridge 44 is unbalanced, the power amplifier produces correspondingly unbalanced currents through the two halves of the solenoid winding, and this in turn causes a cylindrical motor core 112 within the winding to move in a direction determined by the direction of bridge unbalance.

The core 112 is mechanically connected by linkage diagrammatically indicated at 114 to the variable capacitor 66. As the core moves in response to an unbalance signal from the bridge 44, the capacitor 66 is readjusted to a value such that the bridge again is balanced, at which point the core ceases to move.

The action of the motor is reversible in that the direction of movement of the core 112 is determined by the relative magnitudes of the currents flowing through the two halves of the solenoid winding, which in turn is determined by the phase of the unbalance signal produced by the bridge 44. A detailed description of a motor and rebalancing capacitor suitable for the purposes outlined herein is set forth in a copending application Serial No. 456,537, filed by Graydon Smith on September 16, 1954.

The linkage 114 also is connected to the movable pen 116 of a recorder shown partially and schematically at 118, and which includes a circular chart 120 rotating beneath the pen at a constant speed. This linkage is arranged, by any conventional means not shown herein, to reposition the pen in accordance with movements of the solenoid core 112 and thereby to make a continuous record of the value of the voltage being measured. It will be apparent to those skilled in the art that the linkage 114 also can be connected to a standard controller mechanism (not shown), e.g. arranged to maintain the potential of the voltage source being measured at a substantially constant value.

Although in the embodiment described herein the voltage being measured comes from a source of D.-C. potential, the invention also is applicable for use with sources of A.-C. potential. For example, the voltage of a 60 cycle signal can be recorded by a system like that of Figure 1 but differing in that a 60 cycle band-rejection filter is employed in place of the D.-C. blocking capacitor 40; such a filter may simply comprise a suitable inductor connected in parallel with the blocking capacitor to form a combined circuit resonant at 60 cycles.

The filter should, of course, provide sufficient attenuation to effectively prevent feed-through of any 60 cycle components to the bridge 44, to assure that no significant current is drawn from the source being measured and also to avoid interference with normal operation of the bridge. To simplify the filtering problem, it may be desirable to arrange the oscillator 58 such that it generates a relatively high-frequency output signal, e.g. a radio-frequency signal. Alternatively, if the voltage being measured is a relatively high-frequency signal, the capacity bridge output may be energized by an oscillator producing an output signal of substantially lower frequency, e.g. 5000 cycles, and in this case the band-rejection filter should be arranged to highly attenuate the high-frequency voltage being measured.

Although a specific preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. Apparatus for use in measuring and recording the changes in potential of a high-impedance voltage source and adapted to produce corresponding changes in output power of substantial magnitude without drawing any effective power from said voltage source; comprising, in combination, a source of voltage the potential of which is to be determined, said voltage source having a pair of output terminals and an internal impedance so great that the flow of any significant current from said source alters the output voltage across its terminals by an amount that is substantial relative to said output voltage, voltage-sensing means comprising a variable capacitor having a pair of conductive plates at least one of which is movable relative to the other plate, circuit means for coupling said plates of said capacitor essentially directly across the terminals of said source of voltage so that the potential of said source appears across said plates, said voltage-sensing means being constructed and arranged in such a manner that said plates are moved relative to one another by variations in electrostatic force resulting from changes in the magnitude of said potential, the relative movement of said plates producing a corresponding change in the electrical capacitance between said plates, biasing spring means operatively connected to a movable one of said plates to apply a force thereto in opposition to said electrostatic force so that said movable plate takes a position relative to the other plate that is proportional to the magnitude of said potential, a capacity-responsive network coupled directly across said plates to sense the changes in relative positioning thereof, said network being energized by an electrical signal having a frequency that is different from the frequency of said source of voltage, filter circuit means forming part of said network and arranged to effectively prevent the flow of any current from said voltage source into said network, and means coupled to said network to produce an output change of substantial power in response to changes in the capacitance between said plates, whereby the output of said apparatus bears a predetermined relationship to the potential being measured.

2. Apparatus as claimed in claim 1, including recording means under the control of said capacity-responsive network for producing a continuous graphic record of the magnitude of said potential.

3. Apparatus as claimed in claim 2, wherein said movable plate is rotatably mounted to move in a plane parallel to the plane of the other plate, the spacing between said plates always remaining constant.

4. Apparatus as claimed in claim 2, wherein said voltage source produces a D.-C. potential, said capacity-responsive network comprising a bridge including resistive and capacitive elements energized by alternating current power, said filter means consisting of a D.-C. blocking capacitor to prevent the passage of current from said source to said bridge

References Cited in the file of this patent

UNITED STATES PATENTS

| | | |
|---|---|---|
| 2,476,496 | Kliever | July 19, 1949 |
| 2,567,253 | Stranze et al. | Sept. 11, 1951 |
| 2,630,008 | Howe et al. | Mar. 3, 1953 |

FOREIGN PATENTS

| | | |
|---|---|---|
| 829,616 | Germany | Jan. 28, 1952 |